(12) United States Patent
Lee

(10) Patent No.: US 8,118,320 B2
(45) Date of Patent: Feb. 21, 2012

(54) STEERING MECHANISM FOR A PUSH AND PULL VEHICLE

(76) Inventor: Rocky Jenlon Lee, Artesia, CA (US)

( * ) Notice: Subject to any disclaimer, the term of this patent is extended or adjusted under 35 U.S.C. 154(b) by 373 days.

(21) Appl. No.: 12/248,043

(22) Filed: Oct. 9, 2008

(65) Prior Publication Data

US 2009/0095115 A1  Apr. 16, 2009

Related U.S. Application Data

(60) Provisional application No. 60/979,814, filed on Oct. 13, 2007.

(51) Int. Cl.
*B62M 1/16* (2006.01)
*B62M 1/12* (2006.01)
(52) U.S. Cl. .......................... 280/240; 280/244; 280/234
(58) Field of Classification Search ................. 280/240, 280/243–248, 234
See application file for complete search history.

(56) References Cited

U.S. PATENT DOCUMENTS

| | | | | | |
|---|---|---|---|---|---|
| 614,320 | A | * | 11/1898 | Dennison | 280/234 |
| 813,741 | A | * | 2/1906 | Rudbeck | 280/217 |
| 834,368 | A | * | 10/1906 | Dews | 280/234 |
| 1,041,936 | A | * | 10/1912 | Worthington | 280/240 |
| 1,154,208 | A | * | 9/1915 | Davis | 74/131 |
| 1,154,616 | A | * | 9/1915 | Rundle | 280/234 |
| 1,595,857 | A | * | 8/1926 | Coffman | 280/234 |
| 4,811,964 | A | * | 3/1989 | Horn | 280/250.1 |
| 4,925,200 | A | * | 5/1990 | Jones | 280/233 |
| 5,330,218 | A | * | 7/1994 | Escudero | 280/245 |
| 5,829,772 | A | * | 11/1998 | Jones | 280/234 |
| 6,932,370 | B2 | * | 8/2005 | Jones et al. | 280/282 |

* cited by examiner

*Primary Examiner* — Paul N Dickson
*Assistant Examiner* — Wesley Potter
(74) *Attorney, Agent, or Firm* — Rocky Jenlon Lee

(57) ABSTRACT

A steering mechanism for a push-and-pull vehicle provides a handlebar to be used to steer a vehicle left and right while simultaneously being used to drive the vehicle forward by pushing and pulling action. The handlebar is at the top of a swing pole, the swing pole being held by a turning sleeve on a swing arm pivoted on the vehicle frame. The swing pole connects the handlebar to a frame supported u-joint which is connected to a vehicle steering mechanism. The turning sleeve connects the handlebar and swing pole to the swing arm, the output of the swing arm driving the vehicle forward.

8 Claims, 10 Drawing Sheets

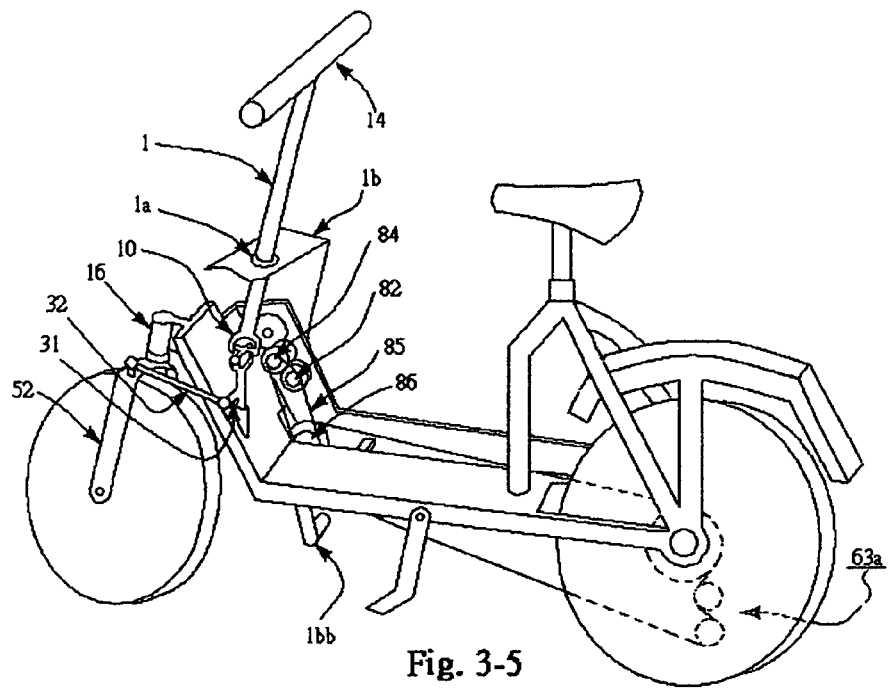
Fig. 3-5
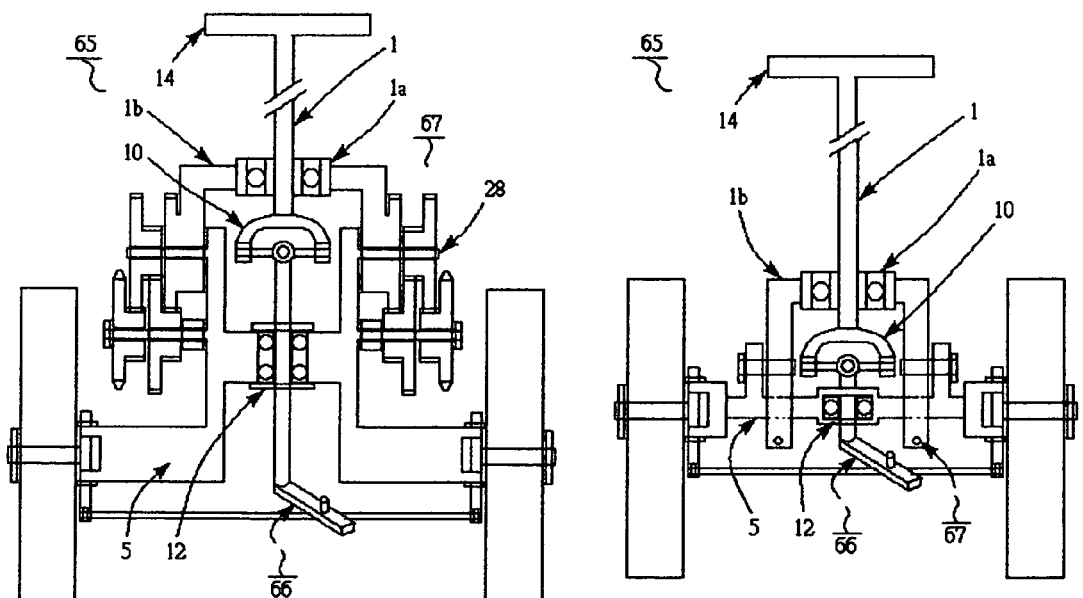
Fig. 4
Fig. 4-1

US 8,118,320 B2

STEERING MECHANISM FOR A PUSH AND PULL VEHICLE

CROSS REFERENCE TO RELATED APPLICATION

This application claims the benefit of and priority from U.S. provisional application No. 60/979,814 filed on Oct. 13, 2007

BACKGROUND OF INVENTION

1. Field of the Invention

Present invention relates to a push-and-pull action to power a vehicle. A pushing or a pulling or a push-pull action refers to a swing action hereafter which uses single pushing, single pulling or both push-pull forces by hand, feet or body weight. Present invention can be applied on handlebar skateboards, pushing scooters, bicycles, scooters, electric bike, and bike-quads. By using a handlebar as leverage, it makes said vehicle moving forward and at same time handlebar steers front wheel(s) to turn vehicle direction by turning left and right as a bicycle's handlebar.

2. Brief Description of the Prior Art

U.S. Pat. Nos. 6,764,089, 7,195,264, USA Rowbike at www.rowbike.com has a row machine on a bicycle, it only applies on single pulling action and uses two cables to steer the front wheel. The cable some how always has an elastic result, its backlash will not give rider as solid feeling as a regular bicycle on steering especially at almost stop speed, and because cables natural slacking it needs to be checked and adjusted periodically. There is a difficulty since swing pole changing its angle all the time in swing action and handlebar on said swing pole changes its angle all the time when turning, like a helicopter blade needs to turn and changing angle at same time, so it is difficult to make swing action and turning action be able to exist independently.

SUMMARY OF THE INVENTION

Present invention solve the problem and provides maintenance free, solid, fast reaction steering feeling as a regular bicycle while be able to active both push and pull actions; a swing device which contains a handlebar, a swing pole, a turning sleeve, swing arms, a Universal joint (refer as U-joint hereafter), a U-joint bearing, and one-way devices to achieve swing and turning both at same time. Using swing arm and a U-joint, it coordinates swing and turning actions and makes both actions possible to exist independently. As a result:
1. U-joint is simple, positive driving, no backlash, and maintenance-free, this makes fast reaction turning same as a regular bicycle.
2. Swing arm solid pivot supported on frame and separates from steering, it sustains huge torque from body weight, by a slow motion action to run a good distance and make present invention gracious and easy to operate.

BRIEF DESCRIPTION OF DRAWING

FIG. 1-1 show a U-joint above the U-joint bearing type steering mechanism.
FIG. 1-2 shows a front view of a U-joint inside of a U-joint bearing type.
FIG. 1-3 shows a front view of a U-joint above a U-joint bearing type.
FIG. 2 shows a view of a scooter or bicycle application with swing lock device.
FIG. 2-1 shows side view of a scooter or bicycle application with a derailer device.
FIG. 2-2 shows a view of a scooter or bicycle application with drive inside frame.
FIG. 2-3 shows output gear connects with a feet extension which can swing up for storage.
FIG. 2-4 shows side view of a scooter or bicycle application with treadle from swing arm extension.
FIG. 2-5 shows side view of a scooter or bicycle application with a sliding device on swing pole.
FIG. 2-6 shows side view of a scooter or application a sliding device inside of the swing pole.
FIG. 3 shows a partially opened side view of a steering arm type on single front wheel scooter.
FIG. 3-1 shows a top view of FIG. 3 on single front wheel type at left tuning angle position.
FIG. 3-2 shows a top view of FIG. 3 on single front wheel type at straight angle position.
FIG. 3-3 shows a top view of FIG. 3 on single front wheel type at right tuning angle position.
FIG. 3-4 shows a view of a steering arm type single front wheel pushing scooter application.
FIG. 3-5 shows partially opened view on a big wheel bicycle with steering arm type.
FIG. 4 shows a front view of two-front wheel application with increasing gear ratio at both sides.
FIG. 4-1 shows a front view of two-front wheel application for a wheel chair application.
FIG. 4-2 shows change direction mechanism by a sprocket drives a chain, return loop by idler.
FIG. 4-3 shows FIG. 4-2 application on a four wheel scooter.
FIG. 4-4 shows change-direction mechanism by 2 set driving sprocket, one with a loop by an idler.
FIG. 4-5 shows change direction mechanism by one shaft drives 2 one-way sprockets by 2 chains.
FIG. 4-6 shows change direction mechanism by two meshing gear type.
FIG. 4-7 shows a top view of a bicycle application with two mesh gear type with derailer device.
FIG. 4-8 shows a view of a bicycle application with two mesh gear drive derailer device.
FIG. 5 shows a view of front wheel drive type application.
FIG. 5-1 shows a front view of front wheel drive type application.
FIG. 6 shows combines a swing device and a rocking device application.
FIG. 7 shows a side view of swing arm by two U-joint and parallel bars type application.
FIG. 7-1 shows a view of swing arm is substituted by two U-joint and parallel bars type.

DRAWING NUMBER LIST 1 swing pole, 1a turning sleeve, 1b swing arm, 1bb treadle, 1bx extension, 1b1 swing block, 1b2 fixed block, 1b3, 1b4 parallelism bar, 1b5, 1b6, 1b7, 1b8 pin, 3 front wheel, 4 ball joint, 5 frame, 5a connecting plate, 5b bearing plate, 5c bearing, 6 pulling matter, 7 one-way device, 8 rear wheel, 9 returning spring, 10 U-joint, 10a upper U-joint, 10b lower U-joint, 10c connecting shaft, 11 turning output gear, 12 U-joint bearing, 12a bearing inner ring, 12b bearing outer ring, 14 handlebar, 16 steering shaft, 20 stopper, 21 stopper, 22 swing arm gear, 22a one-way sprocket, 22b locking pin, 22c block ring, 23 idler gear, 24 one-way gear, 25 increasing ratio device, 25a input gear, 25b output gear, 26 seat, 27 chain, 27a idler, 27b idler, 28 swing arm pivot, 29 hook pocket, 30 leverage extension, 31 steering linkage, 32 steering connecting arm, 33 one-way gear, 40a spline shaft, 41 a sliding device, 41a slide, 41b pins, 41c spline socket, 43 yoke, 45 sprocket, 45a sprocket, 46 chain, 46a chain, 47 a pair of one-way sprocket, 47a one-way sprocket, 47b one-way sprocket, 47c shaft, 48 idler sprocket, 52 front wheel fork, 54 locking device, 55 release handle, 56 friction plate, 57 lock lever, 58 coil type spring, 60 The Swing Powered vehicle, 61 front wheel assembly, 61a steering mechanism, 62 coupling mechanism, 63 rear wheel assembly, 63a derailer device, 64 change direction mechanism, 65 swing device, 66 steer output, 67 swing output. 68 rocking swing device, 71 driving taper-gear, 72 free taper-gear, 73 orbit taper-gear, 80 disturbing shaft, 80a 80b sprocket, 80c idler, 81 gear, 82 one-way sprocket, 83 gear, 84 one-way sprocket, 85 chain, 85a idler, 85b idler, 86 driven sprocket, 90 pivotal shaft, 90a sprocket, 91 moving seat, 92 lever arm, 92a spring, 93 treadle, 94 lever arm, 95 chain, 96 tensioner, 97 missing-teeth gear.

DETAIL DESCRIPTION OF THE INVENTION

Figure 1:
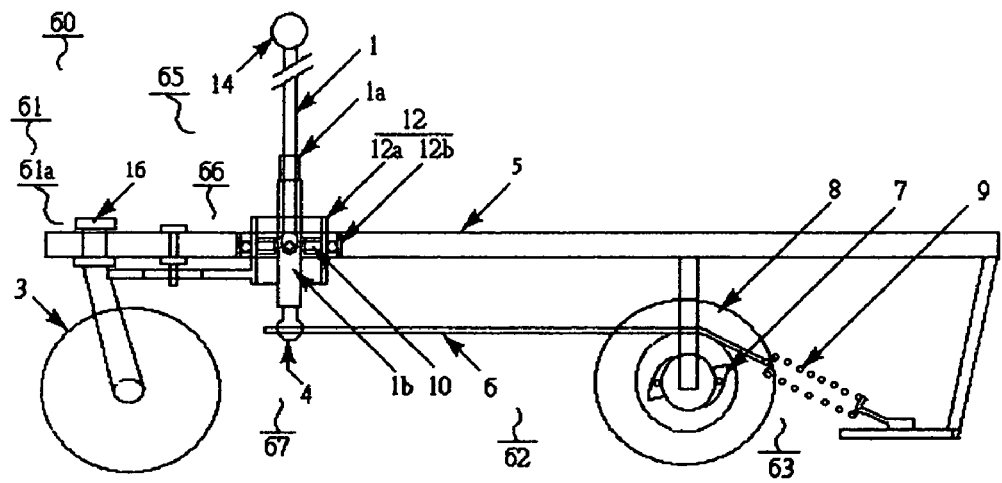
FIG. 1 shows a Swing Powered Vehicle and all assembly.
Figure 1:
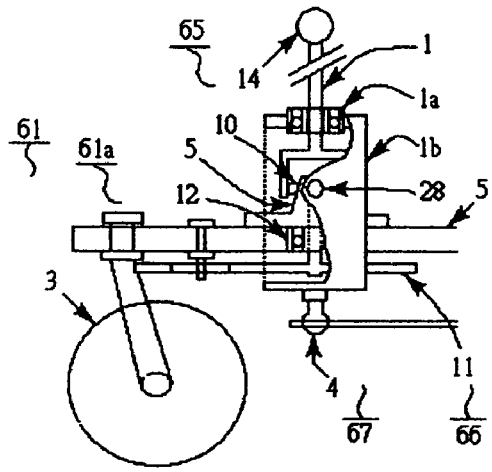

A swing powered vehicle 60 is a man powered vehicle which using handlebar's pushing forward and (or) pulling back a leverage to drive vehicle moving forward. Present invention makes said vehicle can be steered as a regular bicycle. Refer to FIG. 1, a swing powered vehicle 60 consists of a board or frame 5; a front wheel assembly 61 having a well-known steering mechanism 61a at the front end; a rear wheel assembly 63 containing a one-way device 7 at rear end; a swing device 65 with handlebar at top, has a swing output 67 and contains a pivotal supported on said frame 5, said handlebar 14 also links to said steering mechanism 61a through a steering output 66; and a coupling mechanism 62 which connects said swing output 67 to the rear wheel assemble 63; said swing device 65 bottom side contains a ball joint 4 which pulls a pulling matter 6 to drive a one-way device 7 on rear wheel shaft and reset by a spring 9 at return action.

Said frame 5 supports all said assemble and provides a user to stand on or with a seat to sit on and swing the handlebar 14. The frame 5 also includes all kind of frame type as skateboard, a bicycle, a scooter, a quads and wheel chair etc., all refer to frame 5 hereafter.

Said front wheel assembly 61 contains a well-known steering mechanism 61a which controls turning of front wheel(s). Said well-known steering mechanism 61a on a single turning wheel type, it like a bicycle, a pushing scooter and a tricycle steering mechanism, or on two-turning wheel type, it like a quads, a dun buggy steering mechanism.

Said rear wheel assembly 63 includes a single wheel type as bicycle, which can use a bigger rear wheel than front wheel for a well-known bicycle derailer device 63a; or a two-wheel type as a tricycle or a car type vehicle, also rear wheel assembly 63 may include partial increasing ratio mechanism to magnify the swing stroke.

Said coupling mechanism 62 connects swing output 67 to rear wheel 8, since swing stroke is very small, it may include: an increasing ratio mechanism 25, which consists of many sets of one big gear and one small gear together as a gear set, and been arranged by one big gear drives another set's small gear and continue as needed; a shifting device by selecting a different input location of said gear set; a change-direction mechanism 64 to active both pulling pushing action and a derailer device 63a or a free-wheel (one-way device) separates vehicle's coasting. Said change-direction mechanism 64 reset a push action during a pull action or vice versa to make both pushing and pulling actions active. Also said coupling mechanism can be located any where or partial be located at said front wheel assembly 61, said frame 5, said rear wheel assembly 63 as needed, and also said coupling mechanism 62 includes all kind of drive means such as gears, timing belt, sprockets, chains, ball joint, connecting rod, friction wheels, friction belt, one-way device, etc. In order to magnify small swing span to a suitable stroke, coupling mechanism 62 can be arranged a pre-increase ratio before reaching shifting device, this arrangement solve most of heavy load at beginning means and make easy on down stream devices such as change-direction mechanism 64, gear shifting, derailer device 63a, one-way gear or one-way bearing, etc.

Present invention a Steering Mechanism for a Push and Pull Vehicle, concentrates on said swing device 65 which controls said vehicle's steering mechanism 61a, as well as application mechanisms as describe as following:

The swing device 65 contains: a swing pole 1 with handlebar 14 at top, a turning sleeve 1a, a U-joint 10 for steering, a U-joint bearing 12, a swing arm 1b, a steering output 66 and a swing output 67; in which, said swing pole 1 bottom side, goes through and hold by said turning sleeve 1a, then connects or forms to one side or one half of said U-joint 10 (said hold includes: a tight fits, a lose fits or a key driving sliding fits hereafter); another side or another half of said U-joint 10 links to said steering mechanism 61a, and hold by said U-joint bearing 12 which is fixed on vehicle frame 5; furthermore, said turning sleeve 1a is fixed by said swing arm 1b; said swing arm 1b contains pivotal support 28 on vehicle frame 5, and finally drives vehicle wheel forward; in addition, said swing arm pivot support center line lines up with said U-joint's constant driving center point, so said handlebar 14 be able to swing back and forth on swing arm pivot support 28, through said swing output 67 such as gear, sprocket, connecting rod etc., and drive vehicle forward; and also by turning sleeve 1a, said handlebar be able to turn left and right and U-joint links said steering output 66 indirectly drives said steering mechanism by gear, sprocket, turning arm, or direct drives said steering mechanism such as bicycle turning fork.

Figures 1, 2:
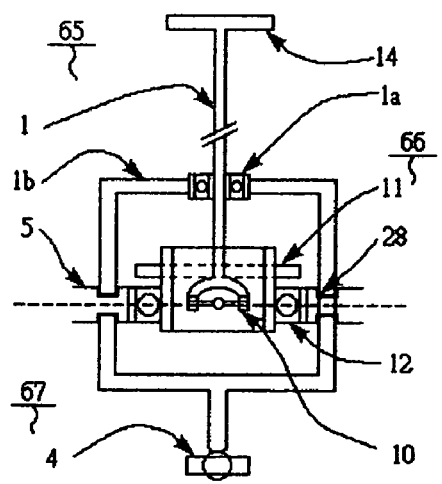
Figures 1, 2, 3:
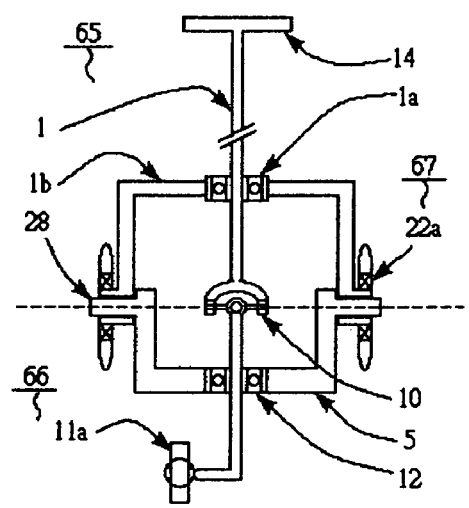

Said handlebar 14 can be any shape and size, provides user to grab and be able to do both turning and swing. Said swing pole 1 is a long bar, and can be any shape or any length for a rigid design, or a telescope type with adjustable locking device as a hand-pull luggage's pulling handle device for a leverage adjustment; steering output 66 drives well-known steering mechanism 61a for turning vehicle direction, that can be fulfilled by many well-know mechanism, for example FIG. 1-2 shows steering output 66 is a gear 11 on the inner ring of U-joint bearing 12, while FIG. 1-3 shows a steering output 66 is a ball joint 11b to pull a steering arm. Also, said U-joint 10 can be above U-joint bearing 12 (as FIG. 1-1 and FIG. 1-3 shows), or inside U-joint bearing 12 (as FIG. 1 and FIG. 1-2 shows), that one straight line of the cross both ends pivotal connect on inner ring wall of U-joint bearing. Said U-joint 10 is two shafts linking by a joint and deliver turning from one shaft to another shaft at an angle, each shaft hold by its own bearing, said turning sleeve 1a is the one and said U-joint bearing is another one, also U-joint bearing 12 is front wheel turning bearing if apply on a bicycle; said linking joint is not limited to a regular cross shape, also can be a square block, a ball with a drive pin type, transmitting spring, constant velocity joint (CV joint) type or any device that allows two shafts connecting and transmitted at different angles all refer to U-joint 10 hereafter.

Said steering output 66 can be a direct drive to front wheel fork on a bicycle (as FIG. 2 show), or indirect by ball joints, steering arms, gears, sprocket chains etc., to drive said steering mechanism 61*a* (as FIG. 1-2, FIG. 1-3, FIG. 4 show).

Said turning sleeve 1*a* inside contains bearings or bushings to support swing pole's turning actions and swing actions; the outside of turning sleeve 1*a* is fixed by said swing arm 1*b* which is pivotal supported by said frame 5.

Said swing arm 1*b* can be any shape or any length, normally parallel with swing pole 1. Said swing arm 1*b* has said turning sleeve 1*a* at top and middle area provides room for said U-joint 10, and has a pivotal support on the frame 5, it can be a fix pin 28 on frame 5 and swing arm 1*b* containing bearing rotates on fix pin or fixed pin on swing arm and frame 5 contains bearing for pin rotation; said pivot support pin parallel with rear wheel shaft to make swing only at back and forth direction; and for balance reason, said swing arm 1*b* (as FIG. 2 shows) forms two 90 degree bending shape with a pivotal support on each side, and middle forms room for said U-joint 10; said swing arm 1*b* together with turning sleeve 1*a* and swing pole 1 and handlebar 14, it forms one rigid piece which be able to sustain a huge swing torque without passing through U-joint 10; Furthermore, two swing arm's pivotal support 28 center line lines up with or pass through said U-joint's constant driving center point which is a constant center point on two shafts driving at any angle, or is angle crossing point (vertex) of two shaft's center line. Said constant driving center point if in a cross shape U-joint is the center point of all over the cross shape portion; on those U-joint inside of U-joint bearing 12 (as FIG. 1-2 shows), it constant driving center point is the same on cross shape center point. If the swing arm's pivot center line is not line up with U-joint's constant driving center point, there is a sliding device 41 between swing pole 1 and swing arm 1*b* to compensate two different arc spans as FIG. 2-5 shows, also sliding device 41 can be formed by a telescope type swing pole as FIG. 2-6 shows.

Figure 2:
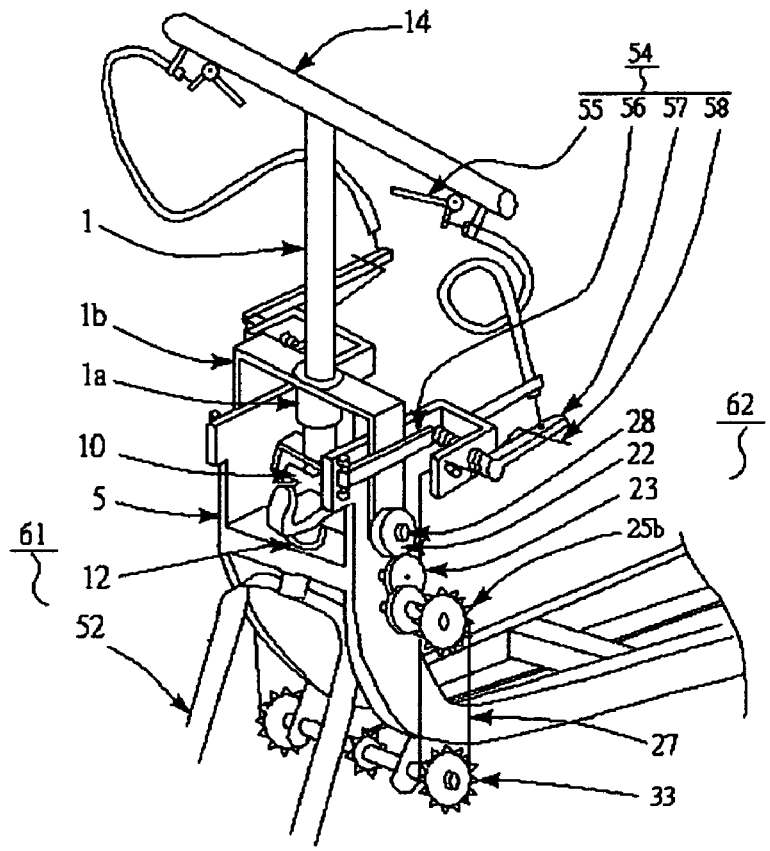
Figures 1, 2:
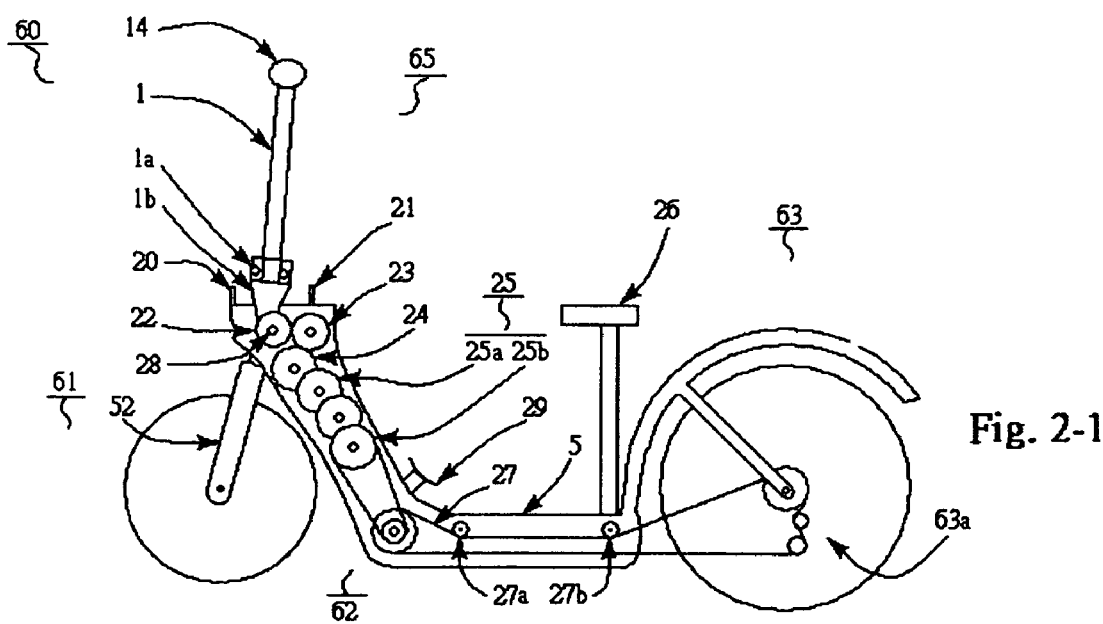
Figure 2:
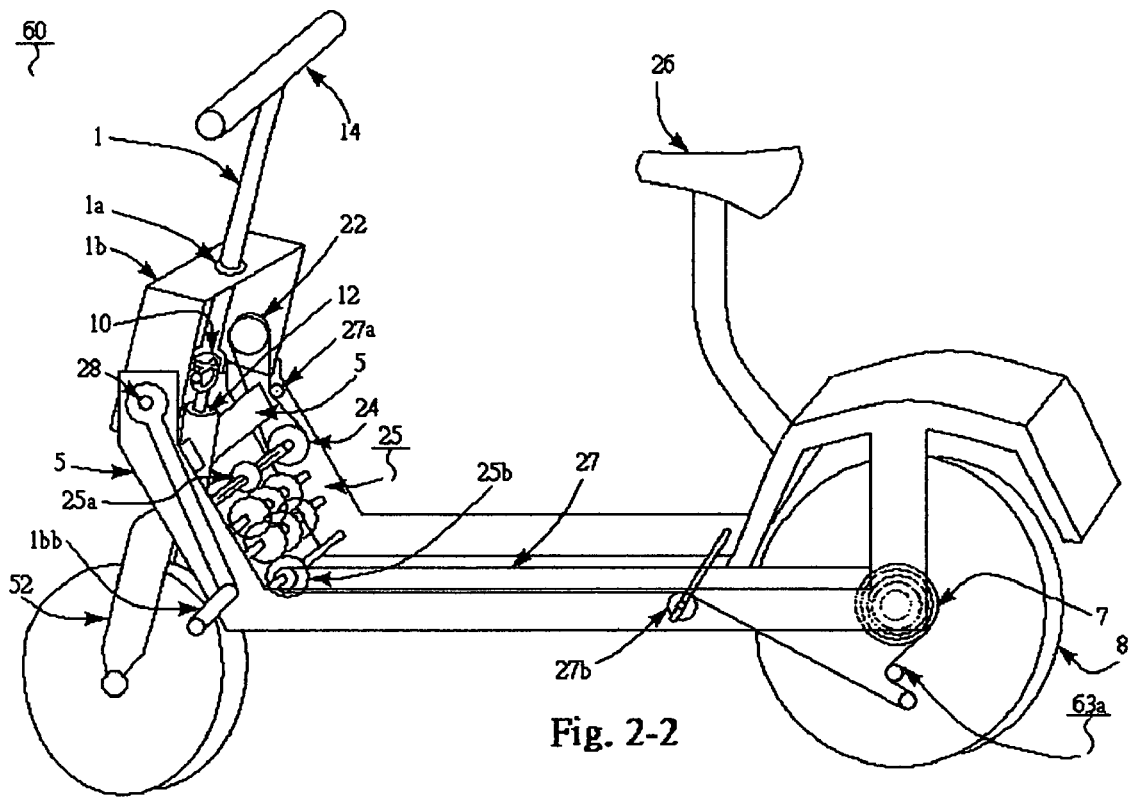
Figures 2, 3:
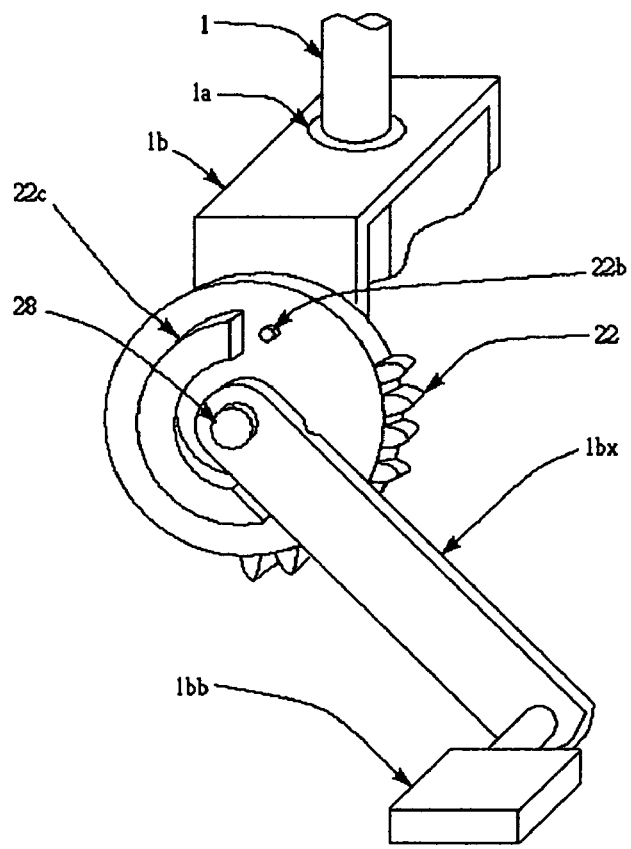
Figures 2, 3, 4:
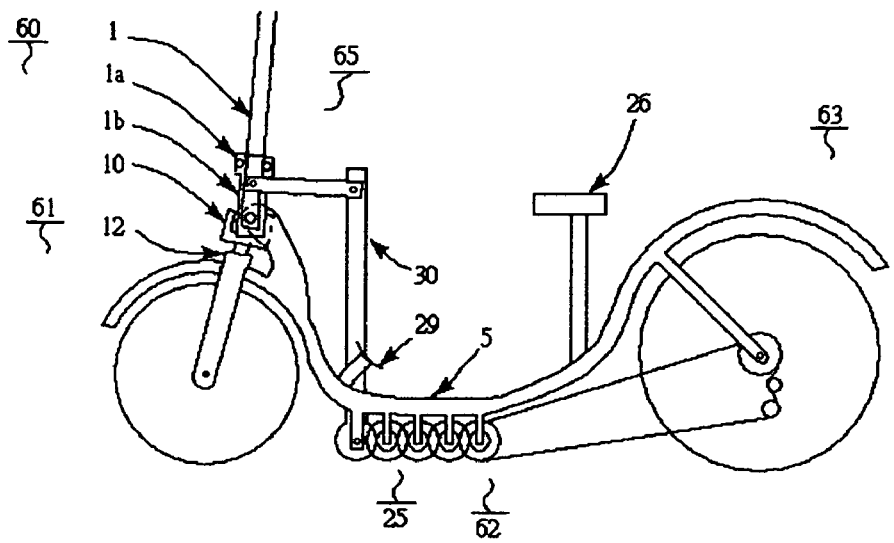
Figures 2, 3, 4, 5:
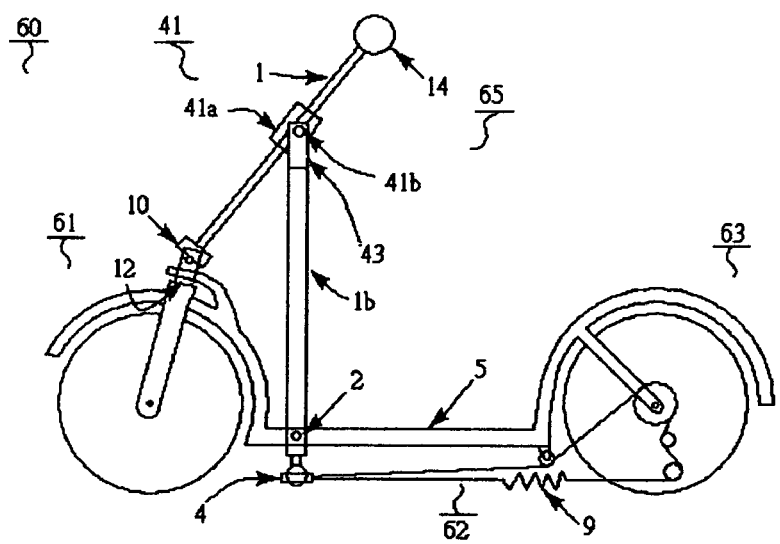

Said swing arm 1*b* also contains said swing output 67, which can be a rotating means to drive said coupling mechanism 62, such as one-way device, gear, timing gear, sprocket, etc., all refer to swing arm gear 22 hereafter, which locate at swing arm center side (not show), or locate at one side or both side of swing arm 1*b*; or can be a pulling matter to drive said coupling mechanism 62 as a ball joint, a connecting rod, chain etc., at bottom side of swing arm 1*b*; For example: FIG. 1-3 shows swing output 67 by two opposite direction one-way sprocket 22*a*, FIG. 1-2 shows swing output 67 by a pulling ball joint at bottom part of said swing arm 1*b*, FIG. 4-3 shows a sprocket fixed with swing arm 1*b* and FIG. 4 shows gears fixed on swing arm 1*b* as one part. Furthermore, at any portion of swing arm 1*b* can be arranged to extend and forms a treadle 1*bb* at bottom of said extension for adding feet action, as one piece as example FIG. 5-1 shows; or as FIG. 2-3 and FIG. 4-7 show, a treadle 1*bb* connects to an extension 1*bx* which pivotal support on swing arm pivotal pin 28, and drives on a block ring 22*c* on said swing arm gear 22 and also be able to swing up by pivot pin 28 and been locked parallel with swing pole 1 by a spring loaded steel locking pin 22*b* for storage; also manually using a locking pin or a screw (not show) connects or separates said extension 1*bx* from swing arm gear 22 and let said treadle 1*bb* be able to stay put at very bottom when not using feet action, or by hinge way to fold up swing arm extension, store treadle 1*bb* at upper front side.

If a pulling action make vehicle forward, it need to be reset by next action which is pushing action; this cause only one active action in a push-and-pull cycle. In order to active both pushing and pulling actions, it needs said change-direction mechanism 64 which consists of one forward driving and one reverse driving on two same direction one-way device, or it is two one-way devices driving same output and one of them changes rotation direction to reset each other while rotation. There are many ways to change rotation direction and a common one is adding one more gear from pulling to pushing before both reaching to two one-way devices on rear wheel, and both reset by a return spring. Refer to FIG. 4-2, 4-4, 4-5, 4-6 show some different way of said change-direction mechanism 64 in present invention.

FIG. 4-2 FIG. 4-3 using both end of a sprocket 45 linked by one chain 46 to drive a shaft 47*c*, which driven by a pair of one-way sprocket set 47 which consists of two one-way sprocket side by side in same direction, and with an idler sprocket 48 to make a return loop instead of two return spring 9 to reset cycle, since the chain 46 is not all in one plane, it may need some guides or operate at a longer distance to avoid derail.

FIG. 4-4 shows two connecting driving sets 45, 45*a* are together as one piece, one-way sprocket 47*a*, 47*b* both drive same shaft 47*c*, 45*a* and 47*a* both connect by inner side of chain 46*a* as regular way, 45 and 48 link by chain 46 as regular way while using outer side of the chain 46 drives 47*b*, since no return spring involved, this can avoid wasting power on return spring while swing; Similarly as FIG. 4-5, a distributing shaft 80 contain 2 sprocket 80*a* 80*b* at both end, sprocket 80*a* been changed direction by connecting at outside loop of pulling chain 6 which powered from swing arm 1*b*, another sprocket 80*b* connects inside loop of chain 6*a* to drive one-way device 7*a* at other side of rear wheel 8; idler 80*c* ensure the chain 6 engagement from sprocket 80*a* to one-way device 7 of rear wheel 8.

Figures 2, 3, 4, 5, 6:
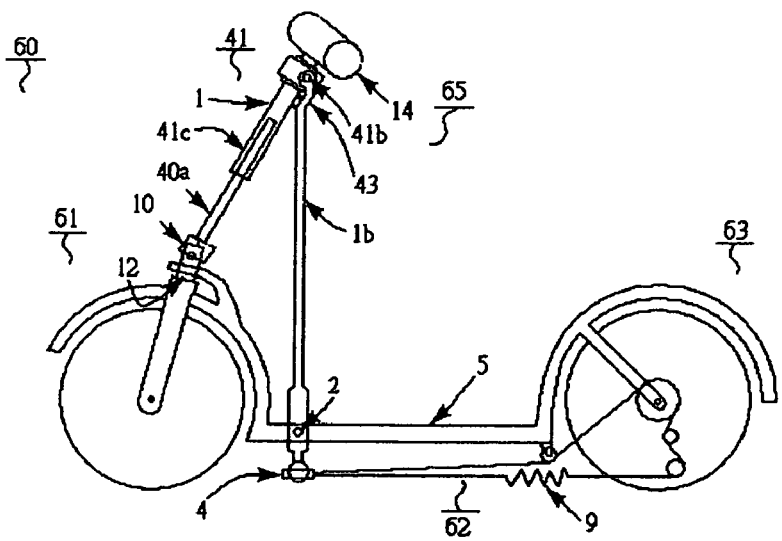
Figure 3:
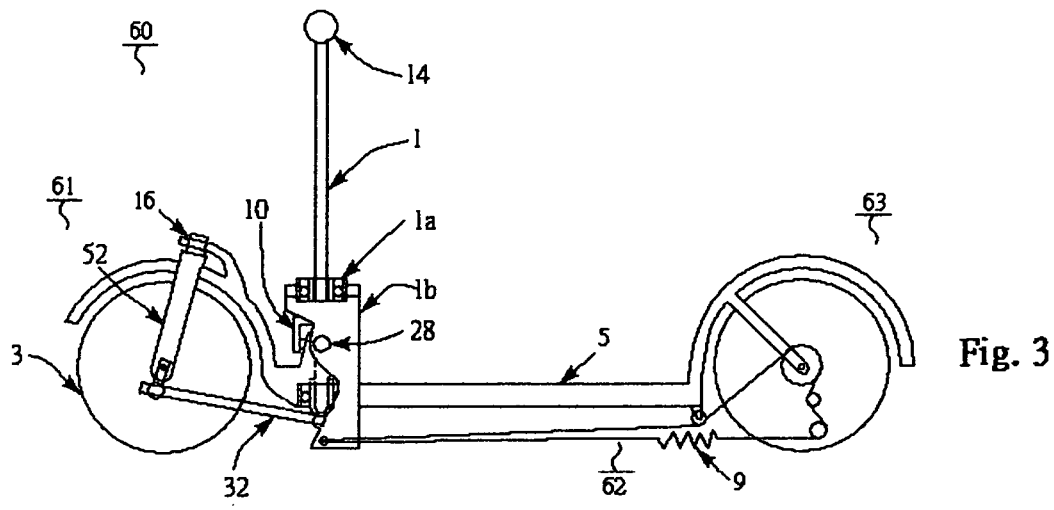
Figures 1, 3:
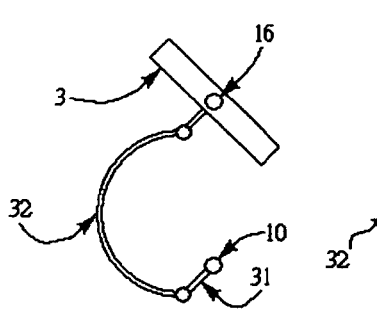
Figures 2, 3:
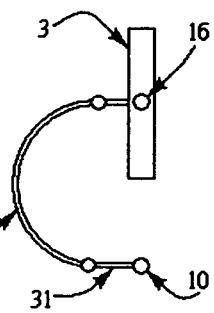
Figure 3:
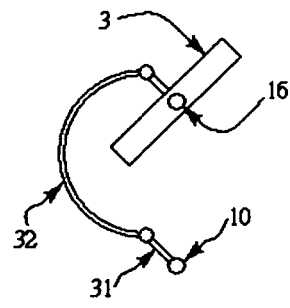
Figures 3, 4:
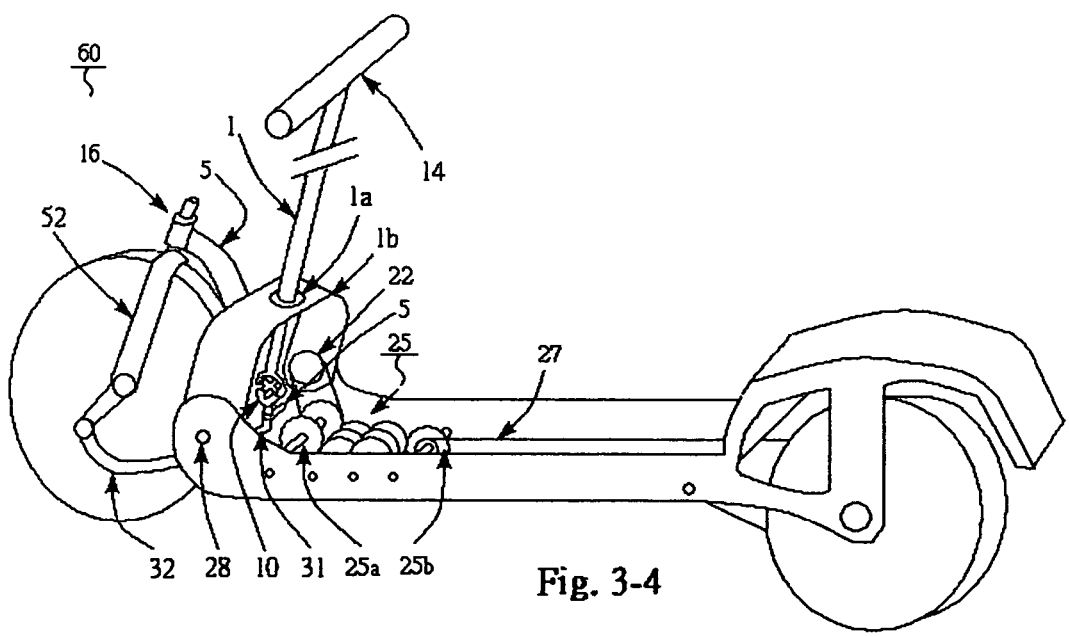

FIG. 4-6 shows using two mashed gear 81 83, each has its own one-way sprocket 82, 84 in same direction, a chain 85 encircles both sprocket 82, 84 and drive a driven sprocket 86, idler 85*a* 85*b* are guiding idlers if needed; either 81 or 83 turns at either direction, one of sprocket (82 or 84) will drive 86 at one direction only; this is compact and much suitable using a bicycle derailer device 63*a* as FIG. 4-7 which drives at right-side, and FIG. 4-8 which drives at left-side; refer to FIG. 4-7 and 4-8, two bearing plate 5*b* support all bearings which support all rotation shafts for two swing arm pivots 28, increasing ratio device 25 and change-direction mechanism 64; two connecting plates 5*a* are part of frame 5, and connect two bearing plates 5*b* by fasten screws (or can be weld as one part) at below swing arm gear 22 to give rooms for next gear connection; bearing 5*c* also fasten (or weld as one part) on frame 5 and hold its shaft on frame 5 and together with all shafts to reinforce bearing plate 5*b* structure; said bearing plate 5*b* also can be an enclose wall (or box) frame which is part of frame 5 or by dismountable fastening means such as bolts, pins to fix on frame 5, and contains said swing device 65, said increasing ratio device 25, said change-direction mechanism 64 and output chain 85 all inside as one assembly unit, even including generator for an electric bike. If bearing plate 5*b* fasten on frame 5 by bolts, with U-joint be able to remove from U-joint bearing feature (such as bicycle turning shaft fasten by a bolt on a wedge inside of turning shaft tube), this will make easier on manufacturing, assembling and maintenance, or on converting a bicycle into a hand swing bicycle.

Normally, handlebar pulling or pushing always have resistance because both engaging in high gear ratio to rear wheel, this cause swing pole 1 staying at one position and makes easy to stroll with walk or give user a balance support while coasting. There are stoppers 20, 21 to limit swing arm stroke also can be a rest point on coasting. But for an un-skilled user to have a feeling of solid support while riding, the swing pole 1 can be set in a locking condition all the time while not at swing action, and use a release handle (by hand or by a release foot paddle) to release the swing arm locking device on swing actions. Also, to set back as a regular bicycle usage, only need is to lock swing arm 1b to frame 5. There are many ways to lock swing arm 1b to frame 5, like latching a pin into a pin hole, a brake on a friction plate, a switching direction on a device of a strong magnetic to lock and unlock a swing plate and a gear plunge into a two-meshed gear etc. Partial of FIG. 2 shows an example on a locking device 54 at said swing arm 1b, it contains a friction plate 56 which supported by the frame 5, a course threading push pad with a lever arm 57, a coil type spring 58 to keep locking the friction plate 56, a release handle 55 at handlebar area to release said coil type spring 58. When said release handle 55 inactive, handlebar 14 only makes turning just like a regular bicycle or like a foot pushing scooter. Also on FIG. 2 shows swing arm gear 22 fix on swing arm 1b, gear 23 change direction at one side, both side drive one-way gear 33 at each end and gear 33 shaft center has a chain links to rear wheel.

In order to use full power on pulling and pushing for a sporting user, there are two foot hook pockets 29 on the frame 5 as FIG. 2-1 shows, they provide feet with anchor point on the frame; the feet push down when hands pull, the feet hook on the hook pockets 29 when hands push the handlebar with helping from stomach and feet mussels; also could provide a seat with seat belt and a tall back-support to support swing actions. FIG. 2-1 also show gear arrangement at outside of frame, and will be covered by guards; swing arm 1b has two opposite direction one-way gears at each side: swing arm gear 22 and 22a (not been seen) and make one side a pulling active while another side a pushing active, idler 23 change one direction to make both side forward, and both force combined at gear 24 shaft, and one side gear 24 drives increasing ratio device 25 finally to rear wheel derailer device 63a.

Refer to FIG. 2-2 shows application on bicycle or scooter in present invention. The frame 5 is an H shape, and all gear inside of H frame to make neat. Frame supports the U-joint bearing 12 and swing arm pivot pin 28; the U-joint provides turning and swing angle for the swing pole 1; swing arm gear 22 been fixed on swing arm 1b, one side has idler 23 to change direction (not been seen), both rotate on pivot pin 28 to drive two same direction one-way gears 24 and the shaft of two gear 24 contains an input gear 25a, which slides to a different gear ratio position to make more or less gear set ratio on a increasing ratio device 25, and final output to gear 25b which drives chain 27 to derailer device 63a on rear wheel 8 for more detail speed selection. said increasing ratio device 25 consists of many sets of one big gear and one small gear together as a gear set in two shafts, and been arranged by one big gear drives another set's small gear and continue as needed.

FIG. 2-4 shows a leverage extension of the swing arm 1b to get more leverage if the wheel is big. Above the pivot pin 28, there is a linkage between swing arm and a leverage extension 30, and the output is a fix gear on bottom of leverage extension 30.

FIG. 2-5 shows a swing arm 1b has a different pivot pin center line from said U-joint constant driving center point. There is a sliding device 41 to separate the arc difference between swing pole 1 and swing arm 1b. When pulling swing pole 1, the sliding device 41 slides on swing pole 1 and force the swing arm 1b move back while the sliding device 41 moving up alone with the swing pole 1 accordingly. FIG. 2-6 shows the sliding device 41 is substituted by a spline socket 41c and spline shaft 40a at the swing pole section.

Normally, a single front wheel vehicle has a turning bearing supported by frame 5 at top of a front wheel fork which driven by handlebar 14. Present invention also use U-joint link on a single turning wheel vehicle by a two-turning wheel mechanism, changes a direct driving steering into a way of four-wheel vehicle steering, and leave the frame 5 supporting function still as usual at top of the front wheel fork. This results a longer swing pole for a bigger leverage and capable of a bigger wheel application. In FIG. 3, front wheel 3 still has it steering bearing and shaft 16 at top of the wheel fork 52, the front wheel axle shaft extends out and with a ball joint to connect with a half circle shape steering connecting arm 32 which links by said U-joint's shaft The swing pole 1 and swing arm 1b is supported by the pivot pin 28, when handlebar 14 turns, the shaft of U-joint 10 drive a steering linkage 31 to push or to pull said half circle shape steering connecting arm 32. FIG. 3-1 shows front wheel at left turn position, FIG. 3-2 shows front wheel at straight position, FIG. 3-3 shows front wheel at right turn position. FIG. 3-4 shows an application of a pushing scooter which swing pivot 28 is lower than front wheel; this also relates to FIG. 4-3 which shows a four wheel application; FIG. 3-5 shows a big wheel bicycle application with changing-direction mechanism 64 by two-mashed-gear type and a derailer device 63a. Normally, derailer device 63a need to be certain height to avoid chain touching to ground, present invention can apply said two meshing gear device working with an independent derailer device 63a with its own shaft which are high above ground and rotatable supported by frame 5, and use a fix sprocket on shaft to drive a chain which link to rear wheel. This will result in a smaller wheel application with derailer device 63a speed-change like skateboard type scooter application.

FIG. 4, FIG. 4-1 shows a front view of present invention in a four wheel application or a wheel chair application. It uses same basic function as single front wheel type as mentioned before, and apply changes to fit into two turning wheel type steering mechanism. Because it has more room for coupling mechanism 62, the swing output 67 can be easier to modify as needed. In a wheel chair application, since it doesn't need a fast speed, a fewer transmission gear is involved because it big rear wheels. It also can be a single turning wheel as front part of bicycle application with two big rear wheels and become a good excise machine all day long while moving around in house or anywhere.

Present invention fits better on an electric bicycle than a regular bicycle because it doesn't need regular foot peddles which one leg at front and another leg at back; Present invention apply on a electric bicycle or vehicle that uses swing arm 1b connect to said increasing ratio mechanism 25 and use one-way device to drive a generator or an alternator to charge battery, and use a big inertia wheel to stabilize generator speed, same time also be able to operate vehicle steering, and use electronic control to command a motor or a motorize hub at front wheel or rear wheel to make forward or reverse. This will have much flexibility on component, location and operating situation; without a transmission device, user can accumulate the generated power, save into battery by swing actions at a comfortable level and time, and then uses maximum power to over come instant needs such as start up or speed up; also just like a man powered vehicle, it will never run out of power. Due to the scope of present invention, it won't be practical to describe variety and detail of electronic motor control and charging system.

Figures 2, 4:
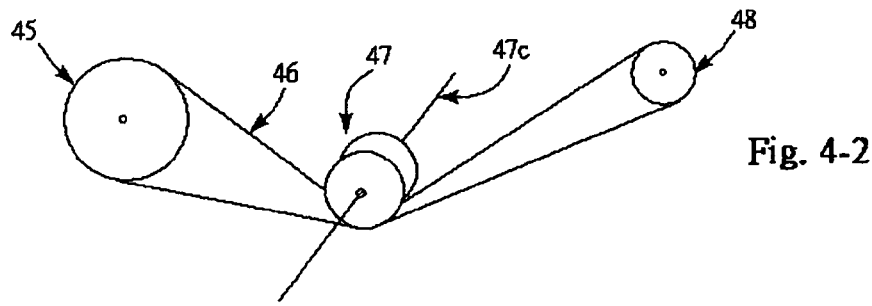
Figures 3, 4:
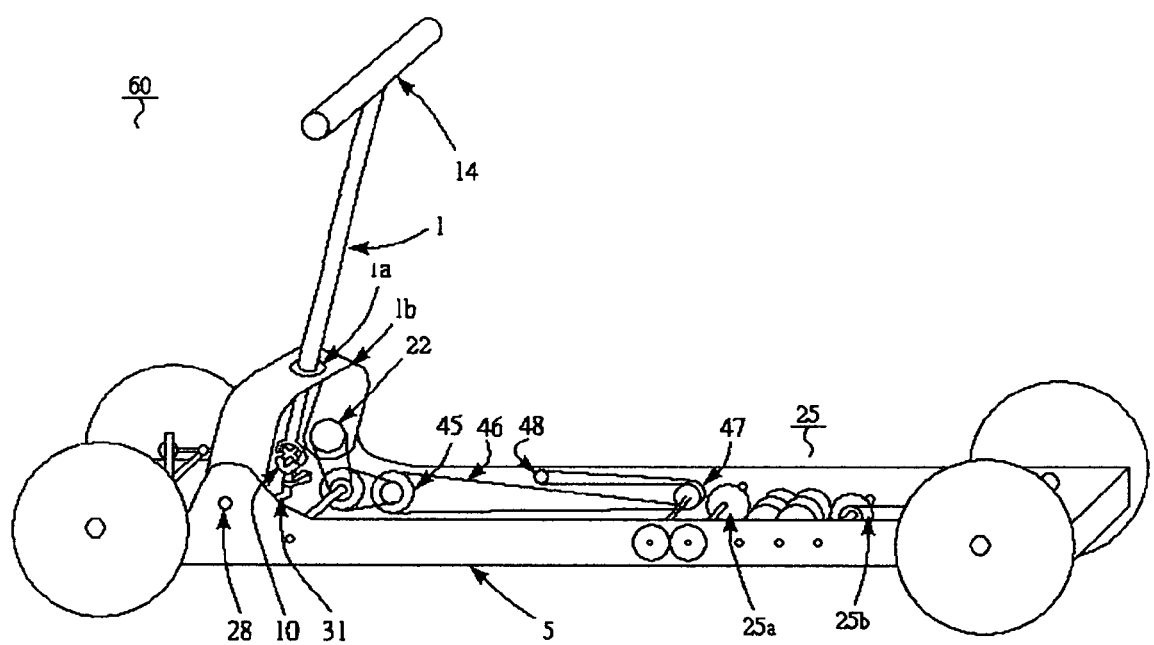
Figure 4:
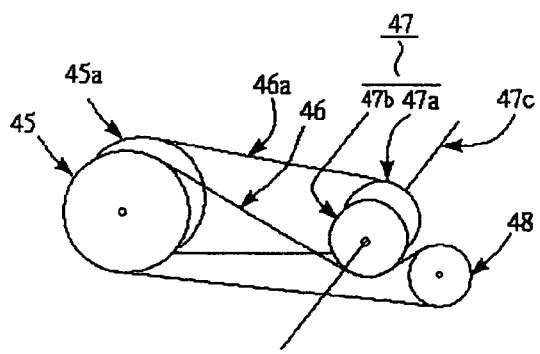
Figures 4, 5:
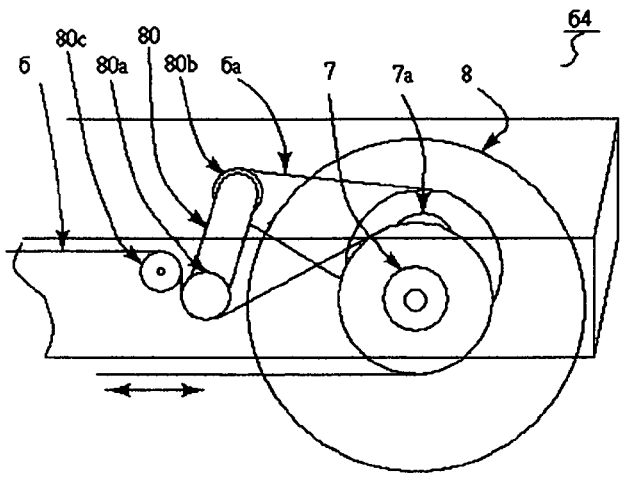
Figures 4, 5, 6:
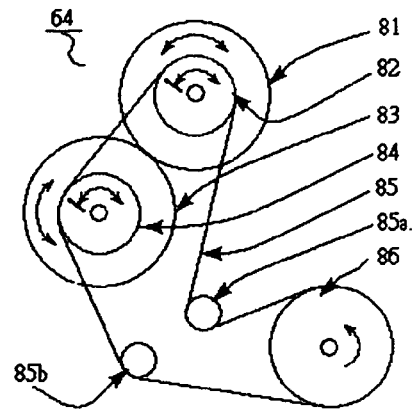
Figures 4, 5, 6, 7:
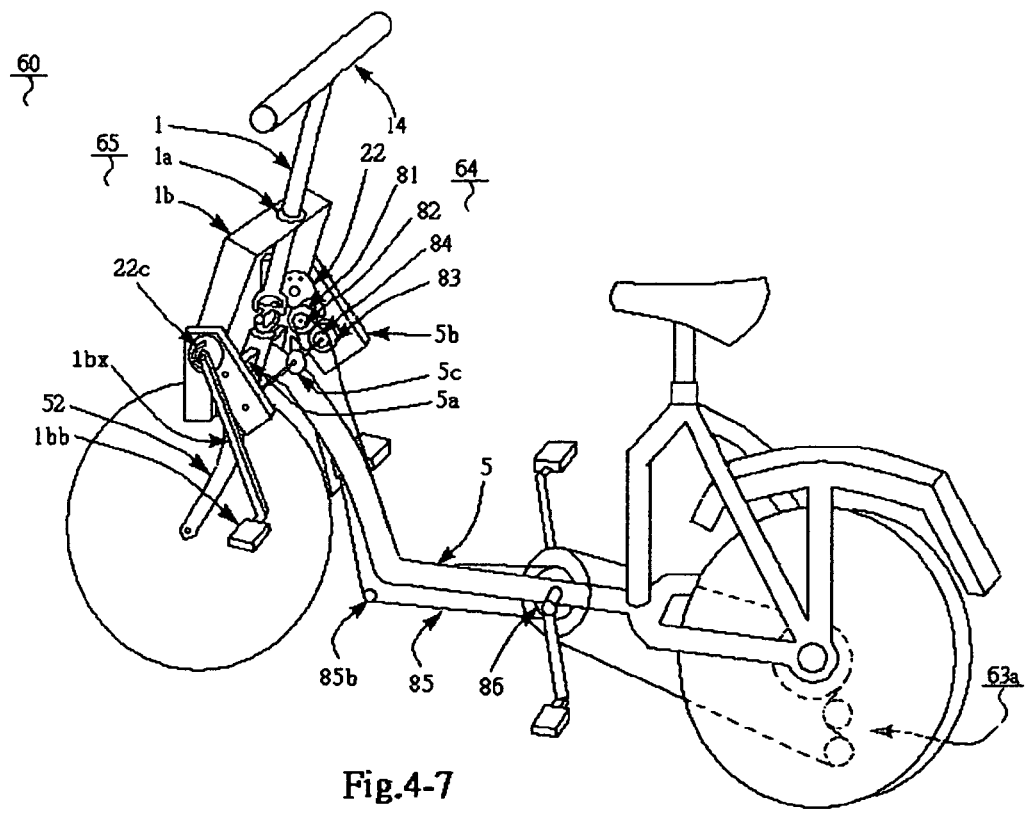
Figures 4, 5, 6, 7, 8:
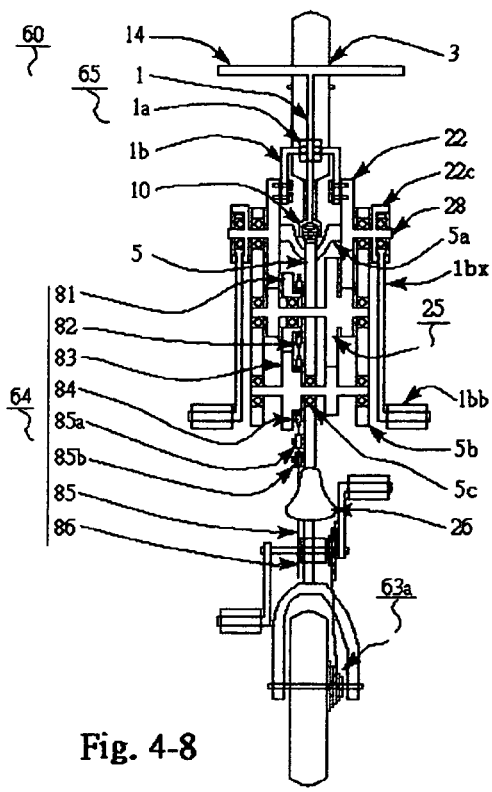
Figure 5:
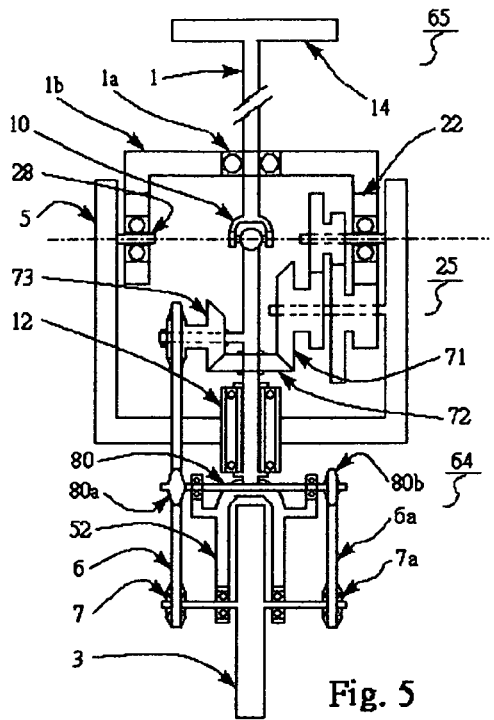
Figures 1, 5:
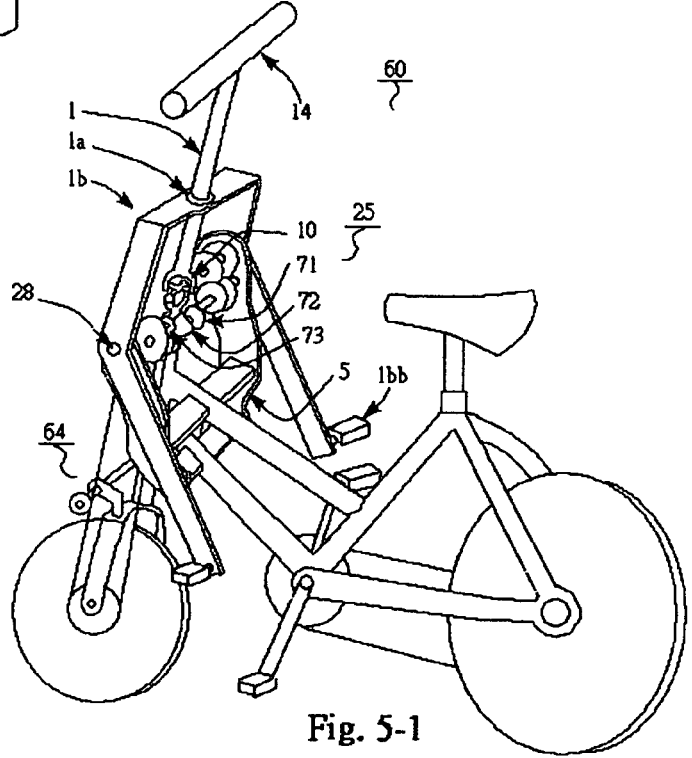
Figure 6:
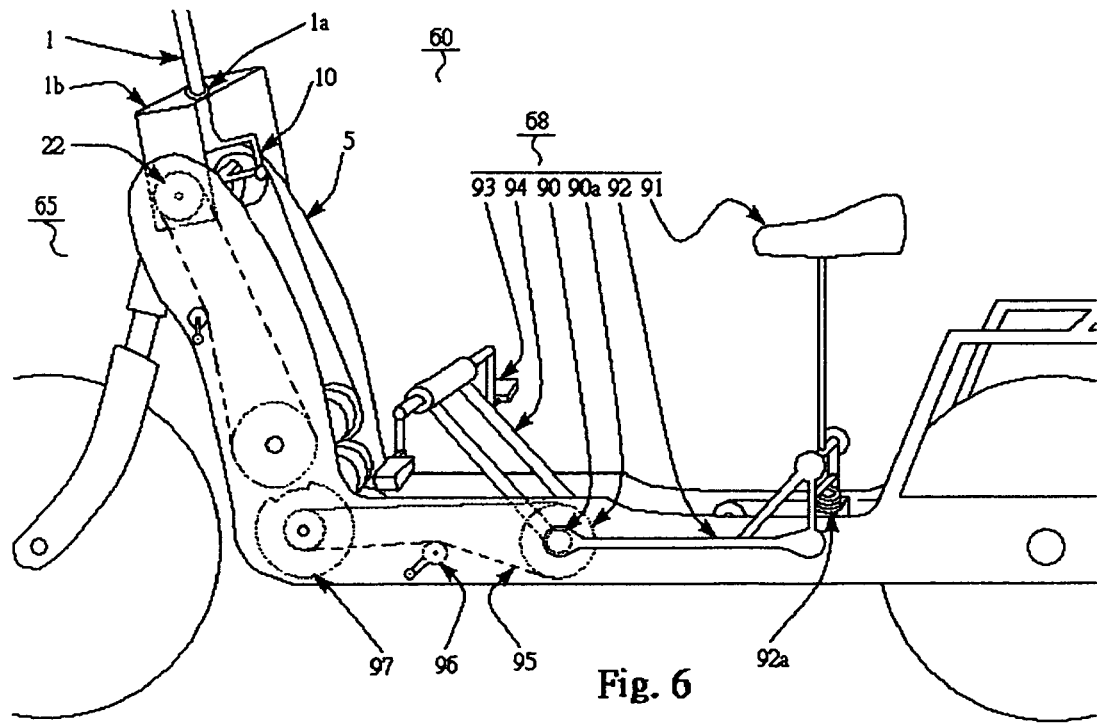
Figure 7:
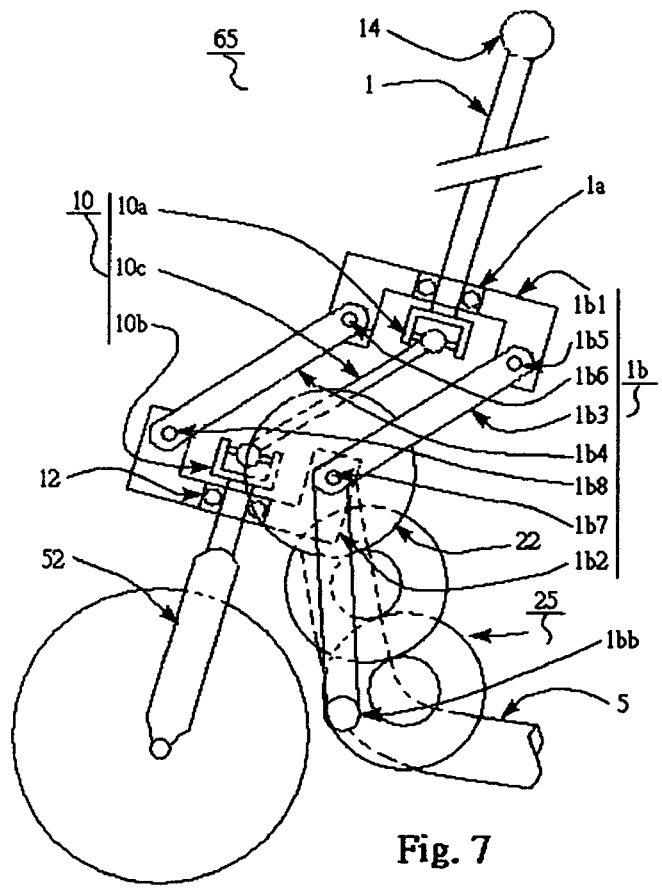
Figures 1, 7:
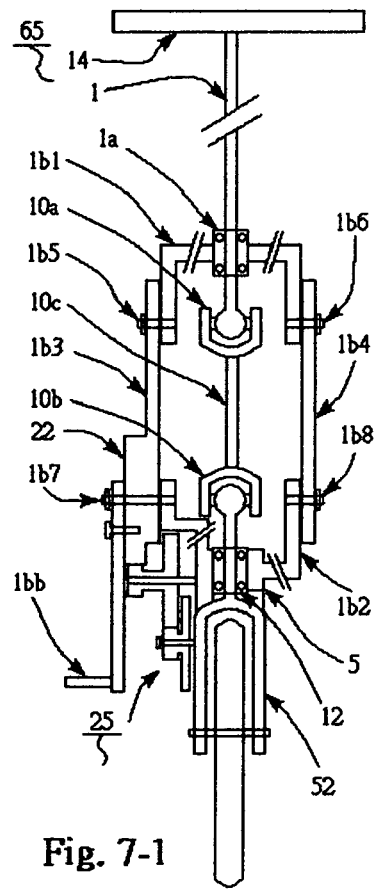

Furthermore, present invention also can be a front-wheel drive on bicycle or tricycle application. Since it independently exists, it can fit into a regular bicycle front end to make a swing by hand and peddling by feet together. Refer to FIG. 7 7-1, swing arm 1b drives an increasing ratio device 25, finally drives a driving taper-gear 71 which supported by frame 5, and said driving taper-gear 71 meshes a free taper-gear 72 which rotates freely on steering shaft, and drives an orbit taper-gear which shaft supported by steering shaft; and said orbit taper-gear 73 drives said changing direction mechanism 64 which drives vehicle forward both pushing and pulling action. When swing handlebar 1, orbit taper-gear 73 rotates back-and-forth to drive said change-direction mechanism 64 and make wheel move forward. Since orbit taper-gear shaft is supported by turning portion of front wheel 3, it will drive front wheel 3 to rotate a little extra or less of turning angle depend turning direction when handlebar turning, but it is too small to feel while front wheel is running.

Since human hands power are much less than human feet power, present invention also add a rocking device 68 to use body weight to help speed-up on high gear or at start up situation; same effect as body stands up on bicycle peddle. Refer to FIG. 6, a rocking device 68 which contains a treadle 93 (for balance reason it comes as a pair) with a leverage by a treadle-arm 94 which having a pivot support 90 on frame 5, a moving seat 91 with a leverage by a seat-arm 92 which connects to said pivot support 90 and forms an angle (preferable 90 to 180 degree but not limit to) and become a seesaw effect; said pivotal shaft 90 contains sprocket 90a and a chain 95 with a tensioner 96 drives a missing-teeth gear 97 which will miss driving with swing arm gear 22 when said moving seat 91 at lowest or highest position to disengage driving power for resting mode, there is a spring 92a as a cushion also to reset moving seat 91 out of said missing teeth area to continues action cycle if needed. Said rocking device 68 connects with swing device 65 both make said vehicle move forward. For a smooth motion, rocking device 68 is arranged with swing device 65 to make pull action matching with treadle action and pushing action matching moving seat action. By grasp on said handlebar 14, do pull-stand-up on said treadle 93 and push-sit-down to said moving seat 70 and use pushing, pulling and body weight work on said rocking device 68 and powers said vehicle 60 moving forward. Also said treadle 93 action can be substituted by said swing arm 1b extension treadle 1bb action.

Although constant velocity joint (CV joint) can maintain front wheel same turning angle with handlebar 14 at any swing angle, the cost is much more than U-joint, present invention also use two U-joint to offset each other's angle variation when turning. Refer to FIG. 7, 7-1 swing arm 1b contains: a swing block 1b1, a fix block 1b2 which is fixed on frame 5, and a pair of two (4 piece) parallelism bars 1b3 1b4, links between said blocks on four corners by a pair of 4 (8 piece) pivotal pins 1b5 1b6 1b7 1b8, said swing block 1b1 center contains said turning sleeve 1a which hold an upper U-joint 10a, said fix block 1b2 center contains said U-joint bearing 12 which hold a lower U-joint 10b, said upper and lower U-joint linked by a connecting shaft 10c with same fork direction, said upper U-joint constant driving center point is on plane of four pivotal pins center point of swing block 1b1, said lower U-joint constant driving center point is on plane of four pivotal pins center point of said fixed block 1b2, this will keep said connecting shaft 10c parallel with two parallelism bars 1b3 1b4 and cause wheel turning exact angle with handlebar turning angle. When swing, handlebar 14 and swing pole 1 maintain same angle and push turning sleeve 1a and move swing block 1b1 swing on a pair of pins 1b7 1b8, since fixed block 1b2 is fixed on frame 5 and makes parallel bar 1b3 1b4 and connecting shaft 1oc all swinging parallel. Finally at fix block, one bottom pivot of 4 parallel bars supports an output gear which connects or been fixed on said parallel bar, and drives vehicle forward; (in figure shows bottom pivot 1b7 support swing arm gear 22 which fixed on 1b3 and drives vehicle forward.)

Present invention also applies on a multiple person tandem ride bicycle. With present invention on first rider swing and control direction at same time, rest riders use a swing arm without turning sleeve 1b and U-joint 10 and use chain to link each one-way sprocket on swing arm.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the following claims.

What is claimed is:

1. A steering mechanism for a push-and-pull vehicle, comprising:
   a vehicle frame;
   a turning sleeve;
   a u-joint for steering, wherein said u-joint may be any form of universal or constant velocity joint;
   a u-joint bearing fixed on said vehicle frame;
   a swing pole with a handlebar at the top of said swing pole, wherein said swing pole goes through and is held by said turning sleeve, wherein a bottom end of said swing pole connects to one side or said u-joint and wherein another side of said u-joint links to a vehicle steering mechanism and is held by said u-joint bearing;
   a swing arm, wherein said tuning sleeve is fixedly connected with said swing arm; and
   a pivot support for said swing arm on said vehicle frame;
   wherein the swing arm further comprises a rotating means concentric with a pivot center of the swing arm, wherein said rotating means connects to a coupling mechanism to drive a rear vehicle wheel, the coupling mechanism including an increasing ratio device and a direction-changing mechanism, the direction-changing mechanism driving the rear vehicle wheel forward regardless of the direction of rotation of the rotating means;
   wherein said handlebar is operable to swing said swing arm back and forth on said swing arm pivot support to rotate said rotating means to drive said vehicle forward and said handlebar is operable to turn left and right in said turning sleeve to steer a steered vehicle wheel.

2. The steering mechanism for a push-and-pull vehicle of claim 1, further comprising a locking device to fix said swing arm relative to said vehicle frame.

3. The steering mechanism for a push-and-pull vehicle of claim 1, wherein the direction-changing mechanism comprises one forward driving mechanism and one reverse driving mechanism each driving a respective one-way device, wherein the two one-way devices are oriented in the same direction, whereby both pulling and pushing actions drive the rear vehicle wheel forward.

4. The steering mechanism for a push-and-pull vehicle of claim 1, wherein said swing arm has an extension and a bottom end of said extension includes a treadle.

5. The steering mechanism for a push-and-pull vehicle of claim 1, wherein said swing arm drives said rear vehicle wheel forward via a derailleur device.

6. The steering mechanism for a push-and-pull vehicle of claim 1, wherein said increasing ratio device includes a plurality of gear sets, each gear set comprising one big gear and one small gear fixed together, the plurality of gear sets arranged in serial connection such that the big gear or one gear set connects to the small gear of the next gear set.

7. The steering mechanism for a push-and-pull vehicle of claim 1, wherein said direction-changing mechanism further comprises two meshing gear, each meshed gear including a one-way sprocket, each of the two one-way sprockets oriented in the same direction, and wherein a chain encircles said two one-way sprockets and an output sprocket which drives said rear vehicle wheel.

8. The steering mechanism for a push-and-pull vehicle of claim 1, wherein said direction-changing mechanism further comprises a distributing shaft which includes first and second sprockets, wherein the first sprocket is driven by an outside portion of a first chain loop, the first chain loop extending from said rotating means to one side of said rear vehicle wheel, and wherein the second sprocket drives an inside portion of a second chain-loop extending to the opposite side of said rear vehicle wheel.

* * * * *